US008149702B2

(12) United States Patent
Mathew et al.

(10) Patent No.: US 8,149,702 B2
(45) Date of Patent: Apr. 3, 2012

(54) MULTI-MODE BIT RATE PROCESSOR

(75) Inventors: Deepak Mathew, Wilmington, MA (US); Eric Aardoom, Framingham, MA (US); Timothy Perrin Fisher-Jeffes, Cambridge, MA (US); David Stephen Ivory, Cambridgeshire (GB); Carsten Aagaard Pedersen, Belmont, MA (US); Aiguo Yan, Andover, MA (US)

(73) Assignee: MediaTek Inc., Hsin-Chu (TW)

( * ) Notice: Subject to any disclaimer, the term of this patent is extended or adjusted under 35 U.S.C. 154(b) by 203 days.

(21) Appl. No.: 12/199,640

(22) Filed: Aug. 27, 2008

(65) Prior Publication Data
US 2009/0175205 A1 Jul. 9, 2009

Related U.S. Application Data

(60) Provisional application No. 61/008,966, filed on Dec. 21, 2007.

(51) Int. Cl.
*H04J 1/16* (2006.01)

(52) U.S. Cl. ..................... 370/230.1; 370/428

(58) Field of Classification Search .................. 370/230, 370/310, 503; 455/187.1, 95; 714/748, 776, 714/790
See application file for complete search history.

(56) References Cited

U.S. PATENT DOCUMENTS

| 5,862,189 | A | 1/1999 | Huisken et al. | |
|---|---|---|---|---|
| 6,052,037 | A | 4/2000 | Kaku et al. | 332/100 |
| 2005/0018712 | A1* | 1/2005 | Howard | 370/503 |
| 2005/0235190 | A1* | 10/2005 | Miyazaki et al. | 714/748 |
| 2005/0237932 | A1* | 10/2005 | Liu | 370/230 |
| 2006/0107165 | A1* | 5/2006 | Murata et al. | 714/748 |
| 2007/0110197 | A1 | 5/2007 | Bagchi et al. | |
| 2007/0245219 | A1* | 10/2007 | Yagihashi | 714/776 |
| 2008/0081575 | A1* | 4/2008 | Mathew et al. | 455/187.1 |
| 2008/0137564 | A1* | 6/2008 | Herrmann | 370/310 |

(Continued)

FOREIGN PATENT DOCUMENTS

| EP | 1331742 | 7/2003 |
|---|---|---|
| EP | 1 855 393 | 11/2007 |
| WO | 2005-002073 | 1/2005 |

OTHER PUBLICATIONS

S. Leung et al., "Development of programmable architecture for base-band processing," Euromicro Conference, 2000. *Proceedings of the 26th* Sep. 5-7, 2000, Los Alamitos, CA, USA, IEEE Compu. Soc, US, vol. 1, pp. 362-367.

(Continued)

*Primary Examiner* — Kwang B Yao
*Assistant Examiner* — Syed M Bokhari
(74) *Attorney, Agent, or Firm* — Fish & Richardson P.C.

(57) ABSTRACT

An apparatus for processing signals in a wireless system includes a first memory module to receive input data from a set of physical channels, a first plurality of sub-modules to process the input data. Each of the first plurality of sub-modules is selected to function based upon data and transmission channel specifications. The apparatus also includes a second memory module to receive processed input data and output intermediate data. Locations of the input data in the second memory is allocated in connection with data and transmission channel specifications. The apparatus also includes a second plurality of sub-modules to process the intermediate data. Each of the second plurality of sub-modules is selected to function based upon data and transmission channel specifications. The apparatus also includes a third memory module to receive and output bit rate processing output.

37 Claims, 13 Drawing Sheets

U.S. PATENT DOCUMENTS

2008/0137573 A1* 6/2008 Cave et al. .................... 370/310
2008/0139133 A1* 6/2008 Usuda et al. .................... 455/95
2009/0161796 A1  6/2009 Fisher-Jeffes ................ 375/317
2010/0235722 A1* 9/2010 Lin .............................. 714/790

OTHER PUBLICATIONS

A. Nilsson et al., "Acceleration in programmable multi-standard baseband processors," Radiovetenskap Och Kommunikation, Linköping, Sweden, [Online] Jun. 2005, pp. 1-6. Retrieved from the Internet: URL: http://www.da.isy.liu.se/pubs/ on May 7, 2009.

Olga Zlydareva et al., "Multi-standard wimax/umts system framework based on SDR," *Aerospace Conference, 2008 IEEE*, Piscataway, NJ, Mar. 1, 2008, pp. 1-13.

Parker, "Techniques for the Blind Estimation of Signal to Noise Ratio for Quadrature Modulated Signals," International Symposium on Signal Processing and its Applications, ISSPA, Gold Coast, Australia, Aug. 25-30, 1996, pp. 238-241.

* cited by examiner

MULTI-MODE BIT RATE PROCESSOR

CROSS-REFERENCE TO RELATED APPLICATION

This application claims priority to U.S. Provisional Application Ser. No. 61/008,966, filed Dec. 21, 2007, which is hereby incorporated by reference in its entirety.

BACKGROUND

This document generally relates to wireless communication systems.

Early mobile or wireless communication systems, now referred to as first generation (1G), used analog technology called frequency division multiple access (FDMA) to deliver a radio-based voice channel to a mobile telephone user. In the late 1980s, second generation (2G) systems were deployed using digital technologies. The first U.S. system used time division multiple access (TDMA). In the early 1990s, TDMA technology was used to introduce the Global System for Mobile Communication (GSM) to Europe. In the mid 1990s, code division multiple access (CDMA) became the second type of digital 2G system, with the U.S. introduction of Interim Standard-95 (IS-95).

Wideband CDMA (WCDMA) is a transmission technology for 3G (third generation) Universal Mobile Telecommunications System (UMTS) mobile or wireless communication. WCDMA systems support voice and data transmission with variable data rates in wireless communication channels such as random access channels, paging channels, broadcast channels, etc. WCDMA systems contain one or several radio frequency carriers. Each radio frequency carrier contains a number of spreading codes which may be allocated to provide different data rates to satisfy different mobile user requirements.

WCDMA systems often utilize transport channels which may be mapped to physical channels. The physical layer (layer 1) is the lowest layer in the OSI Reference Model and it supports functions used for the transmission of bit streams on the physical medium. The physical layer subsequently provides data transport services to higher layers of the wireless communication system. Characteristics of a transport channel are defined by its transport format (or format set), specifying the physical layer processing to be applied to the transport channel in question, such as convolutional channel coding and interleaving, and any service-specific rate matching as may be needed. Transport channels may represent services offered by Layer 1 to the higher layers.

TD-SCDMA (Time Division Synchronous Code Division Multiple Access) is also a transmission technology for 3G (third generation) Universal Mobile Telecommunications System (UMTS) mobile or wireless communication. TD-SCDMA uses time domain duplexing in combination with code domain multiple access techniques to support both symmetrical and asymmetrical traffic.

WCDMA and TD-SCDMA standard specification support multiple releases. The release 4 of the specification supports many transport channels including a) common transport channels such as BCH (broadcast channel, often used as a downlink (DL) transport channel to broadcast system and/or cell specific information), FACH (forward access channel), PCH (paging channel), RACH (random access channel), CPCH (common packet channel), and DSCH (downlink shared channel), and b) dedicated channels (DCH) which may be used on the uplink or downlink.

High speed downlink packet access (HSDPA) is an important feature of Release 5 of the third Generation Partnership Project (3GPP) specification and is part of both WCDMA and TD-SCDMA standards. More specifically, HSDPA is a UMTS enhancement to provide increased downlink data rates that is defined in Release 5 of the UMTS specifications. The HSDPA is expected to increase system capacity, reduce roundtrip delay and increase peak data rates. A new shared channel called high speed downlink shared channel (HS-DSCH) has been introduced to support the above goals.

In traditional communication systems, the baseband receiver includes two main components: an inner receiver, also known as a chip rate processor, which mitigates the effects of multi-path and interference, and an outer receiver which performs channel decoding and other symbol rate processing.

SUMMARY

In general, in one aspect, a first memory module receives input data from a set of physical channels; a first plurality of sub-modules are adaptively selected to process the input data, at least some of the first plurality of sub-modules being selected based upon data and transmission channel specifications; a second memory module receives processed input data and outputs intermediate data, in which locations where the input data are stored in the second memory are allocated in connection with the data and transmission channel specifications; a second plurality of sub-modules are adaptively selected to process the intermediate data, at least some of the second plurality of sub-modules being selected based upon the data and transmission channel specifications; and a third memory module receives the data processed by the second plurality of sub-modules.

Implementations may include one or more of the following features. The data and transmission channel specifications are defined in accordance with at least one of: Low Chip Rate (LCR) Time Division Synchronous Code Division Multiple Access (TD-SCDMA) Release 4 channels; LCR High Speed Downlink Packet Access (HSDPA) channels; Frequency Division Duplex (FDD) Wideband Code Division Multiple Access (WCDMA) Release 4 channels; and FDD WCDMA HSDPA channels. The first plurality of sub-modules comprise at least one of: a combined module of a de-modulation module, a constellation re-arrangement module and a de-scrambler module, a frame scaling module, a de-rate matching module (DRM2), a de-interleaver module, and a hybrid automatic repeat request (HARQ) combine and scaling module. The second plurality of sub-modules comprise at least one of: a transmission time interval (TTI) scaling module, a de-rate matching module (DRM1), a channel decoding clipping and quantization module, and a combined module of a channel decoder module, a descrambler module, and a cyclic redundancy check (CRC) module. The de-interleaver module comprises at least one of a second de-interleaver module and a transport channel (TrCH) de-interleaver module. The de-interleaver module is configured to compute read addresses of the first memory module, and compute read and write addresses of the second memory module. The de-rate matching module (DRM2) is configured to operate on data associated with High Speed Downlink Packet Access (HSDPA) channels. The de-rate matching module (DRM2) is configured to operate on data associated with Low Chip Rate (LCR) Release 4 channels. The HARQ combine and scaling module operates on data associated with High Speed Downlink Packet Access (HSDPA) channels. The de-rate matching module (DRM2) is bypassed when performing rate matching of data associated with Frequency Division Duplex (FDD) Release 4 channels. The TTI scaling module operates on data associated with Release 4 channels. The de-rate matching module (DRM1) is configured to operate on data associated with High Speed Downlink Packet Access (HSDPA) channels, and Frequency Division Duplex (FDD) Release 4 channels. The de-rate matching module (DRM1) is bypassed when performing de-rate matching of data associated with Time Division Synchronous Code Division Multiple Access (TD-SCDMA) Release 4 channels. The second memory module comprises at least one of a hybrid automatic repeat request (HARQ) memory and a transmission time interval (TTI) memory that is configured based on data and transmission channel specifications. The second memory module is controlled and configured by software. The second memory module is programmed by software to determine locations in the second memory module for storing data of transport channels associated with High Speed Downlink Packet Access (HSDPA) channels. The second memory module is programmed by software to determine locations in the second memory module for storing data of transport channels associated with Release 4 channels.

In general, in another aspect, a method for processing signals in a wireless system is presented. The method includes storing, in a first memory module, input data from a set of physical channels; processing the input data in selected ones of a first plurality of sub-modules, the selected ones of the first plurality of sub-modules being selected based upon data and transmission channel specifications; and storing, in a second memory module, processed input data, in which locations where the input data are stored in the second memory module are allocated based on the data and transmission channel specifications. The method also includes reading intermediate data from the second memory module; processing the intermediate data in selected ones of a second plurality of sub-modules, the selected ones of the second plurality of sub-modules being selected based upon data and transmission channel specifications; and receiving and outputting bit rate processing data in a third memory module.

Implementations may include one or more of the following features. The data and transmission channel specifications are defined in accordance with at least one of: Low Chip Rate (LCR) Time Division Synchronous Code Division Multiple Access (TD-SCDMA) Release 4 channels; LCR High Speed Downlink Packet Access (HSDPA) channels; Frequency Division Duplex (FDD) Wideband Code Division Multiple Access (WCDMA) Release 4 channels; and FDD WCDMA HSDPA channels. The first plurality of sub-modules comprise at least one of: a combined module of a de-modulation module, a constellation re-arrangement module and a de-scrambler module, a frame scaling module, a de-rate matching module (DRM2), a first de-interleaver module, and a hybrid automatic repeat request (HARQ) combine and scaling module. The second plurality of sub-modules comprise at least one of: a transmission time interval (TTI) scaling module, a de-rate matching module (DRM1), a channel decoding clipping and quantization module, and a combined module of a channel decoder module, a descrambler module, and a cyclic redundancy check (CRC) module. The de-scrambler module of the combined module is bypassed in a Frequency Division Duplex (FDD) signal scheme. The de-interleaver module comprises at least one of a second de-interleaver module and a transport channel (TrCH) de-interleaver module. The de-interleaver module is configured to compute read addresses of the first memory module and compute read and write addresses of the second memory module. The de-rate matching module (DRM2) operates on data associated with High Speed Downlink Packet Access (HSDPA) channels and the Low Chip Rate (LCR) Release 4 channels, and output data to the HARQ combine and scaling module. The HARQ combine and scaling module operates data associated with High Speed Downlink Packet Access (HSDPA) channels. The TTI scaling module operates on data associated with Release 4 channels. The de-rate matching module (DRM1) operates on data associated with High Speed Downlink Packet Access (HSDPA) channels and Frequency Division Duplex (FDD) Release 4 channels. The second memory module comprises at least one of a hybrid automatic repeat request (HARQ) memory and a transmission time interval (TTI) memory that is configured based upon data and transmission channel specifications. The second memory module is controlled and configured by software. The second memory module is programmed by software to determine locations of transport channels associated with High Speed Downlink Packet Access (HSDPA) channels and Release 4 channels in the second memory module.

In general, in another aspect, in a wireless system, user data and interference signals are processed from a set of physical channels in connection with joint detection algorithms. The user data undergoes physical channel demapping, and is processed in a bit rate processor by selectively using a plurality of data processing modules of the bit rate processor based upon data and transmission channel specifications.

Implementations may include one or more of the following features. The data and transmission channel specifications are defined in accordance with at least one of: Low Chip Rate (LCR) Time Division Synchronous Code Division Multiple Access (TD-SCDMA) Release 4 channels; LCR High Speed Downlink Packet Access (HSDPA) channels; Frequency Division Duplex (FDD) Wideband Code Division Multiple Access (WCDMA) Release 4 channels; and FDD WCDMA HSDPA channels.

Advantages may include one or more of the following. A multi-mode bit rate processor can support data transmission and processing in both HSDPA channels and Release 4 channels. The bit rate processor can support multiple transmission data rate and standards, such as Low Chip Rate (LCR) and Frequency Division Duplex (FDD), standards. The multi-mode bit rate processor can have optimized memory organization and reduced chip area. The multi-mode bit rate processor can adaptively select signal processing modules to process signals according to particular data transmission standards and bypass unneeded processing modules.

The details of one or more implementations of the invention are set forth in the accompanying drawings and the description below. Other features, objects, and advantages of the invention will be apparent from the description and drawings, and from the claims.

DETAILED DESCRIPTION

Figure 1A:
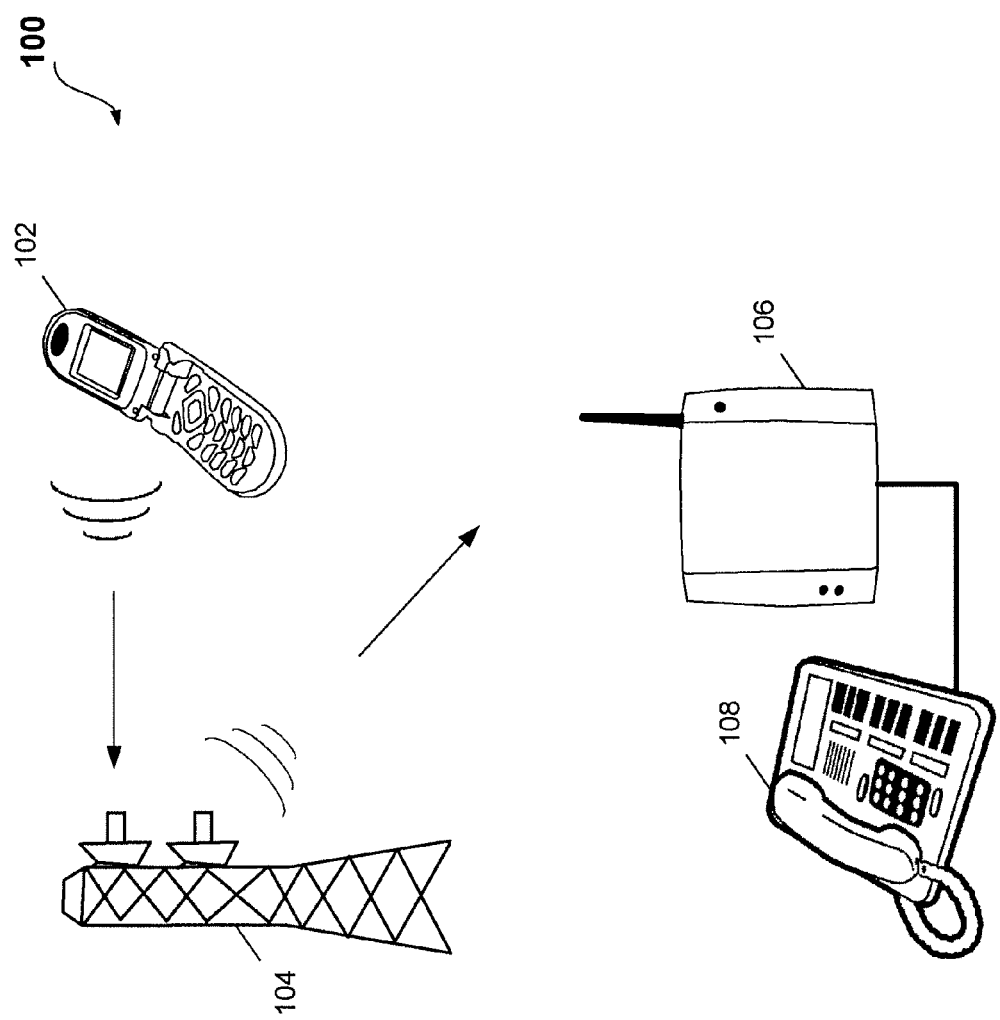
FIG. 1*a* illustrates an example communication system.

Referring to FIG. 1a, a communication system such as a cellular system 100 includes multiple communication channels that may be impaired by one or more sources such as environmental noise. To reduce the effects of such conditions, modulation, encoding/decoding and processing techniques have been developed to assist data transmission and reception. For example, with the ever increasing demand for higher data transmission rates, standards have been promoted to adopt particular techniques. For example, time division synchronous code division multiple access (TD-SCDMA) standards call for combining time division multiple access (TDMA) with an adaptive, synchronous-mode code division multiple access (CDMA) component. Further, various coding and modulation techniques may be used with the TD-SCDMA standard, for example, Quadrature Phase Shift Keying (QPSK) and quadrature amplitude modulation (QAM) modulation schemes may be implemented for improved signal transmission.

By using such standards and processing techniques, the illustrative communication system 100 may allow efficient transmission of information. For example, data (e.g., an audio signal) from a cellular telephone 102 may be transmitted to a cellular network (e.g., represented by a cellular tower 104) and appropriately routed to a cellular terminal 106 for delivery at a telephone 108. In general, the cellular terminal 106 includes the functionality to decode signals from the cellular network and convert the signals into a format recognizable by the telephone 108. Along with the cellular terminal 106, other equipment may also be used for collecting and processing the communication signals, for example, a computing device (e.g., a computer system, personal digital assistant (PDA), etc.) with the appropriate equipment (e.g., modem, wireless connection device such as an air-card, etc.) may be used for connecting to the communication network 100.

Some communication systems may implement a "time structure." Like the time in everyday life that is measured in hours, minutes and seconds, etc., in a wireless communication system data is transmitted in individual packets each associated with specific transmission time. For example, in a time division multiple access (TDMA) system, transmission time may be divided into frames and each frame may be further divided into slots, which are referred to as "time slots".

Figure 1B:
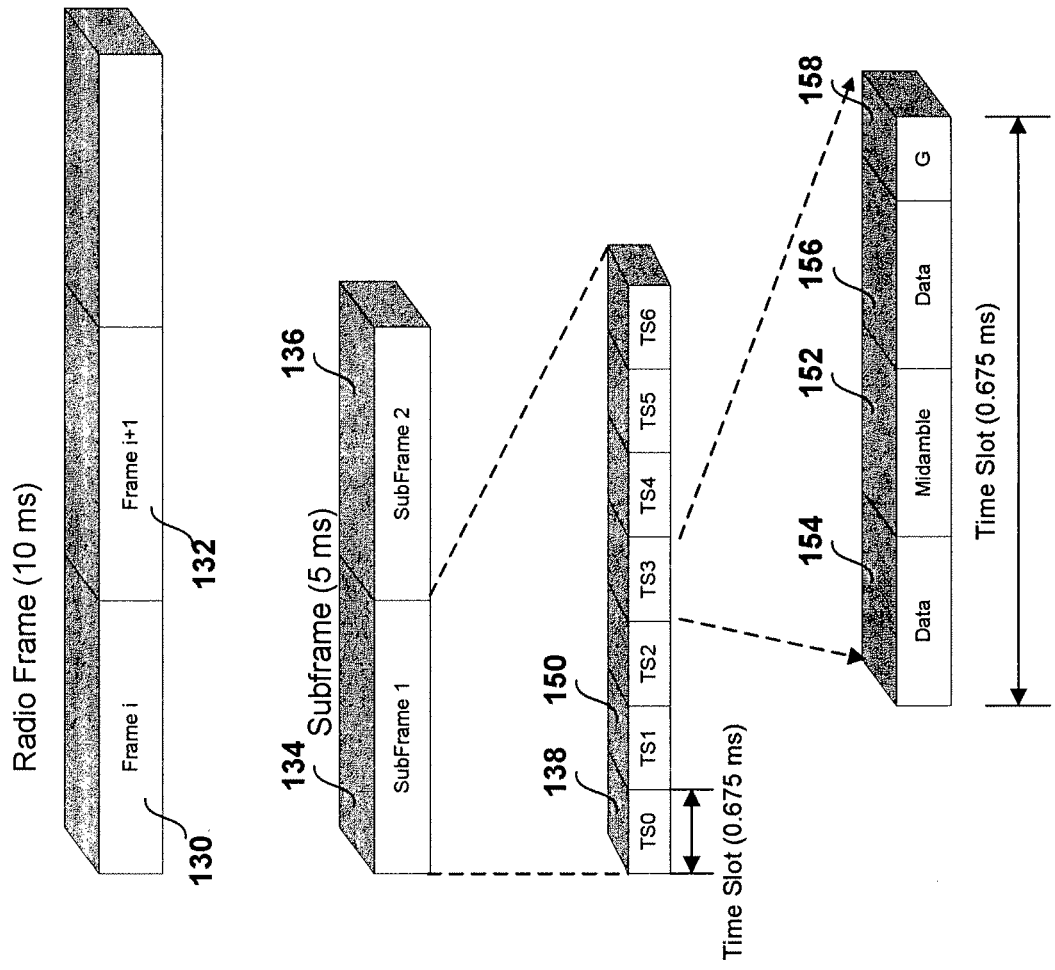
FIG. 1*b* is a diagram of an example TD-SCDMA data structure.

FIG. 1b shows a schematic representation of an example TD-SCDMA data structure. Data is transmitted as a series of radio frames 130, 132, etc., each having a duration of 10 ms (milliseconds). Each radio frame is divided into two sub-frames 134 and 136, each having duration of 5 ms. Each subframe is made up of seven time slots TS0 138, TS1 150, etc., each having a duration of 0.675 ms. Each time slot includes four parts, a midamble 152 with one hundred and forty-four (144) chips duration, two data fields 154, 156 with three hundred and fifty-two (352) chips duration before and after the midamble 152, followed by a guard period 158 of sixteen (16) chips. The midamble 152 carries known data and is used by the receiver to perform channel estimation. The seven time slots (e.g., TS0, TS1, etc.) in each subframe (e.g., 134 or 136) may be divided between uplink and downlink traffic, according to the traffic in each direction.

Figure 2A:
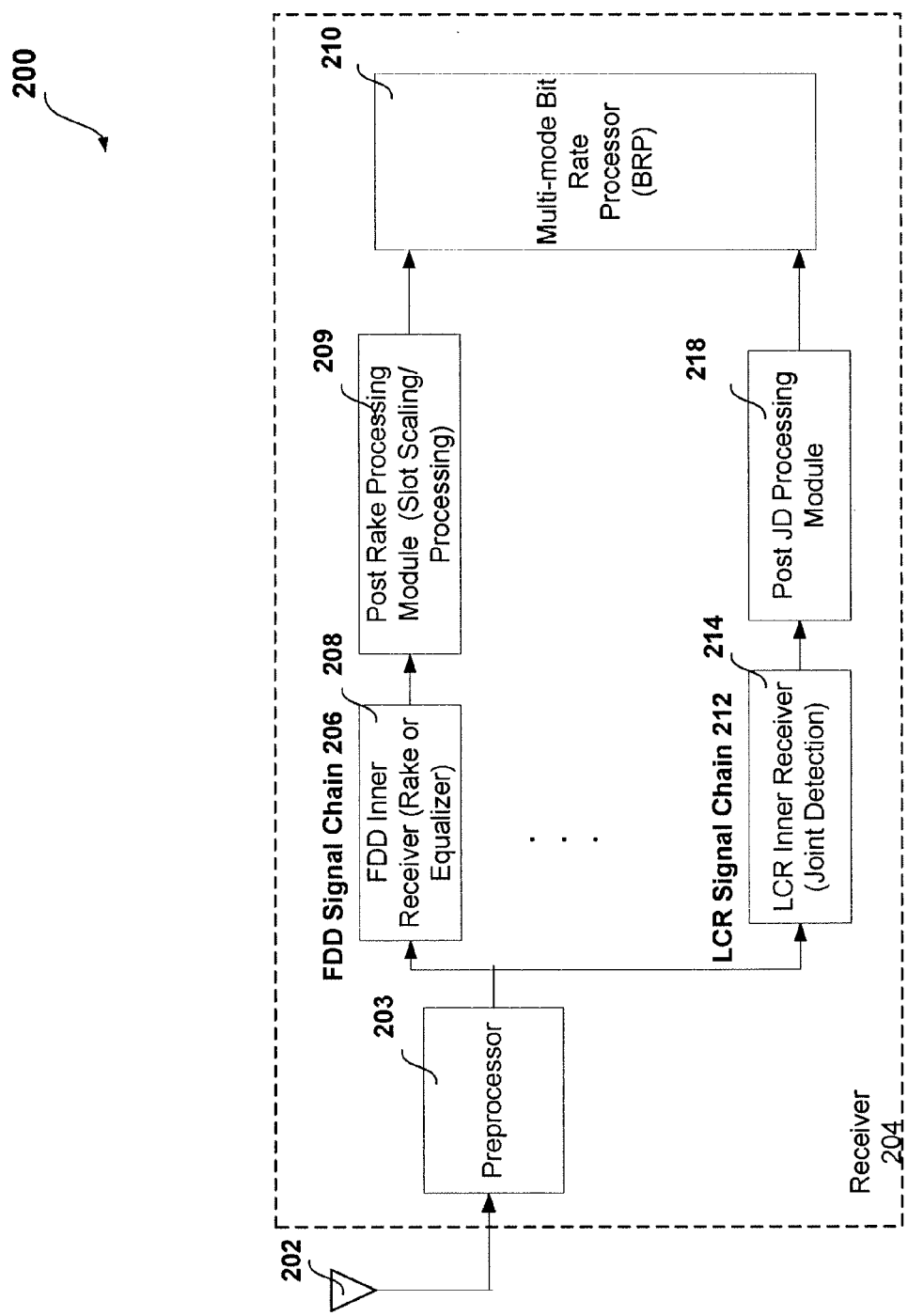
FIG. 2*a* illustrates an example signal downlink receiver in a wireless communication system.

Referring to FIG. 2a, a block diagram represents a portion of an exemplary receiver 204 of a wireless connection device such as a cellular terminal or an air-card (for use with a computing device). In the illustration, an antenna 202 is capable of transmitting and receiving electromagnetic signals to exchange data with one or more other devices and systems. In regards to signal reception, the receiver 204 may include a preprocessor 203 at a radio frequency (RF) stage that processes (e.g., removes carrier signals) the electromagnetic signals received by the antenna 202 and provides a corresponding analog signal to an analog baseband stage for converting into the digital domain. In one implementation, the analog baseband stage includes one or multiple analog-to-digital (A/D) converters for digitizing the signals. With the carrier signal removed and the signals digitized, a collection of data channels (referred to as physical channels) is provided to a digital baseband stage that processes (e.g., demodulates, decodes, etc.) the channel data and produces binary data appropriately formatted for the next portion of the receiver 204 (e.g., software application layer).

The receiver 204 may include a digital signal processor (DSP) for executing software to control operations of various modules of the receiver 204.

In the receiver 204, wireless signals that comply with different telecommunication standards can be processed differently. In other words, receiver 204, which may be fabricated in a miniaturized electronic/integrated circuit (i.e., IC, micro-circuit, microchip, or chip), may selectively invoke various signal processing modules of the receiver 204 to process incoming wireless signals with different transmission standards and signal rates, rather than limit the design of the receiver 204 to one specific signal standard.

For example, a frequency division duplex (FDD) signal can be processed using an FDD signal chain 206 that includes an FDD inner receiver 208, a post rake processing module 209, and a multi-mode BRP 210 that is configured for FDD signal. An LCR signal can be processed using an LCR signal chain 212 that includes an LCR inner receiver 214, a post JD processing module 218, and the multi-mode BRP 210 configured for LCR signal. The multi-mode bit rate processor (BRP) 210 is configured to support both HSDPA channels and Release 4 channels. For example, the multi-mode BRP 210 may function in four operation modes to support: 1) LCR TD-SCDMA Release 4 channels, 2) LCR HSDPA channels, 3) FDD WCDMA Release 4 channels, and 4) FDD WCDMA HSDPA channels. A particular combination of signal processing modules in the receiver 204 can be selected to function in connection with a specific operating mode of the multi-mode BRP 210.

In this description, FDD refers to frequency division duplex, and LCR refers to low chip rate. The FDD signal chain 206 can be implemented to support, e.g., FDD WCDMA Release 4 channels or FDD WCDMA HSDPA channels. The LCR signal chain 212 can be implemented to support, e.g., LCR TD-SCDMA Release 4 channels or LCR HSDPA channels.

Figure 2B:
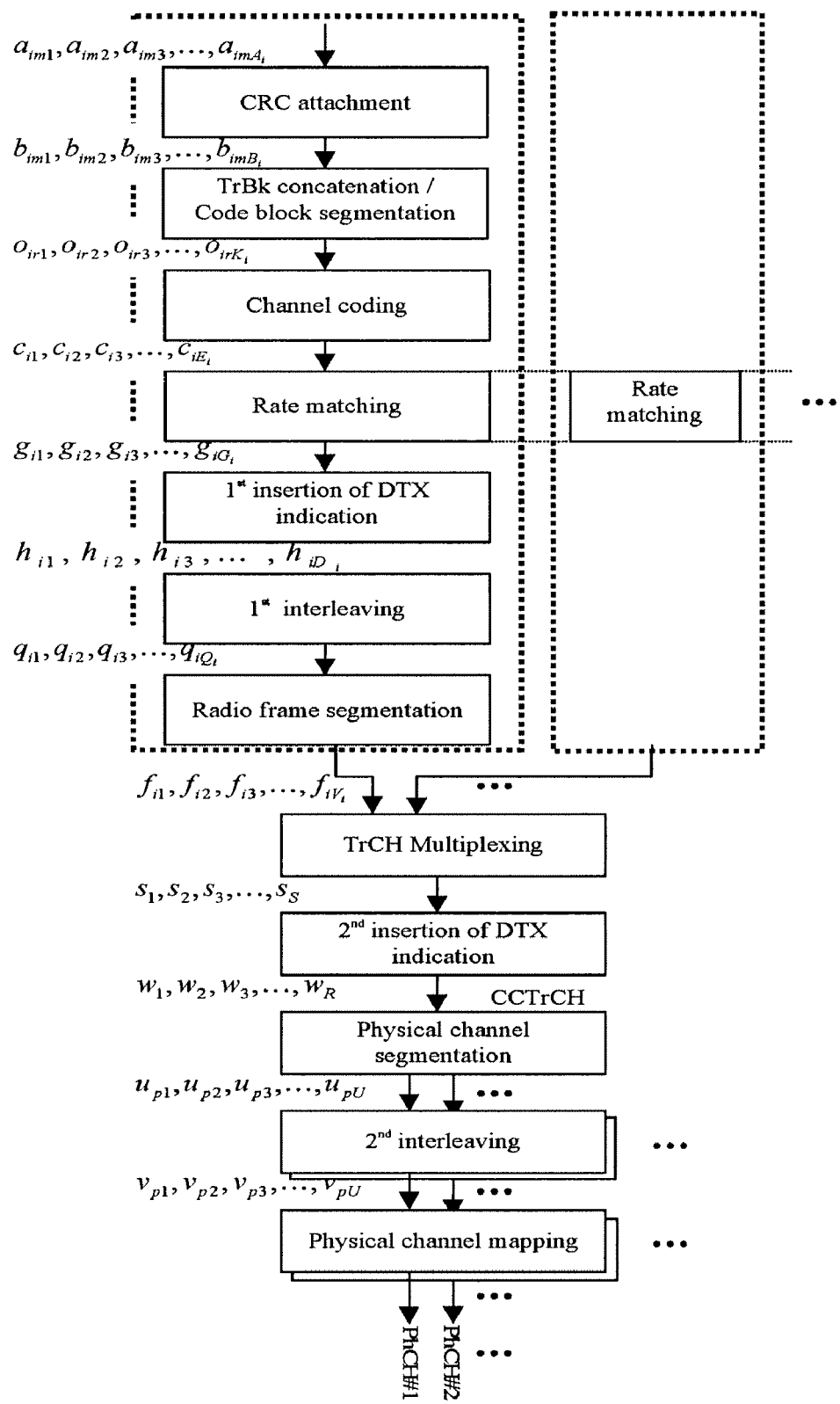
FIG. 2*b* illustrates a block diagram of a transport channel multiplexing structure (Transmitter BRP) for Release 4 FDD channels (Reference 3GPP Specification TS 25.212 V5.a.0).
Figure 2C:
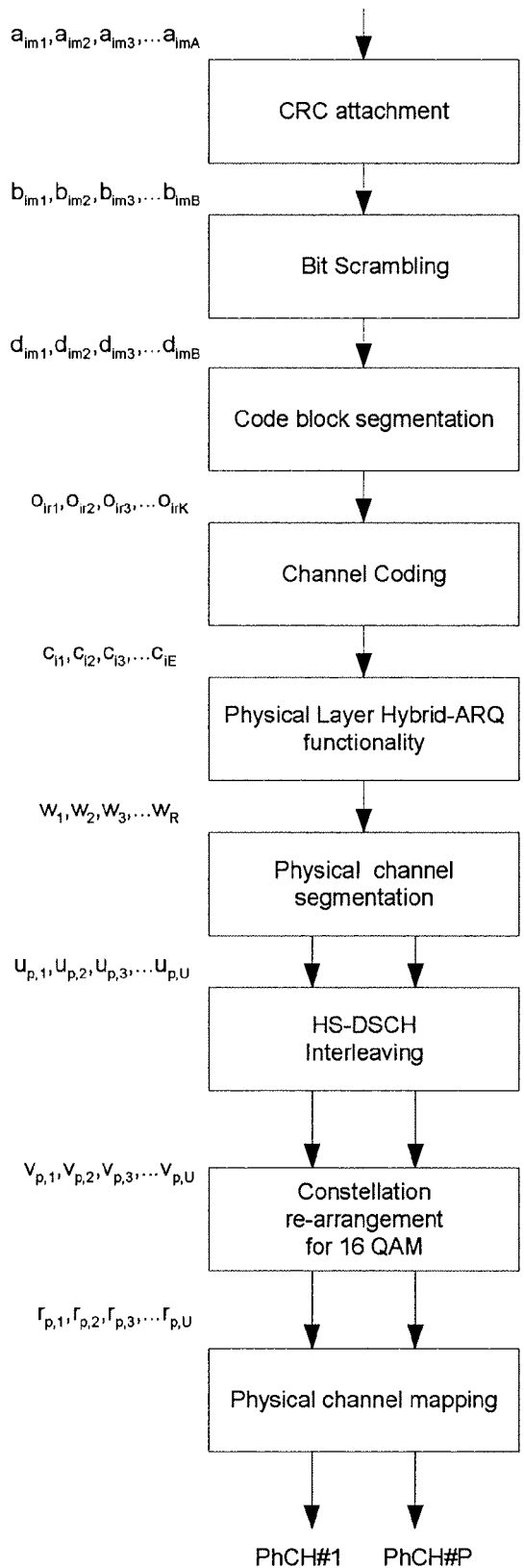
FIG. 2*c* illustrates a block diagram of a transport channel multiplexing structure (Transmitter BRP) for HSDPA FDD data channels (Reference 3GPP Specification TS 25.212 V5.a.0).
Figure 2D:
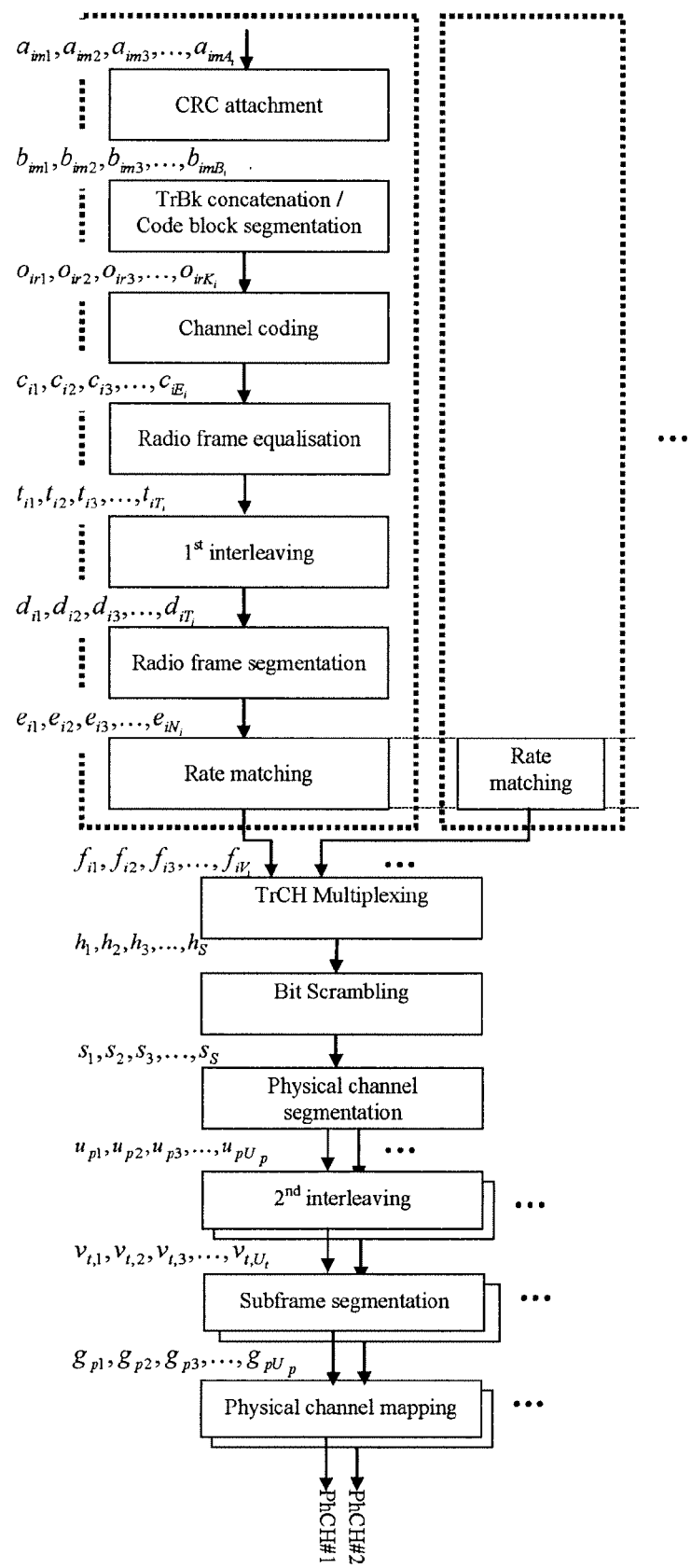
FIG. 2d illustrates a block diagram of a transport channel multiplexing structure (Transmitter BRP) for HSDPA Release 4 channels (Reference 3GPP Specification TS 25.222 V5.7.0).
Figure 2E:
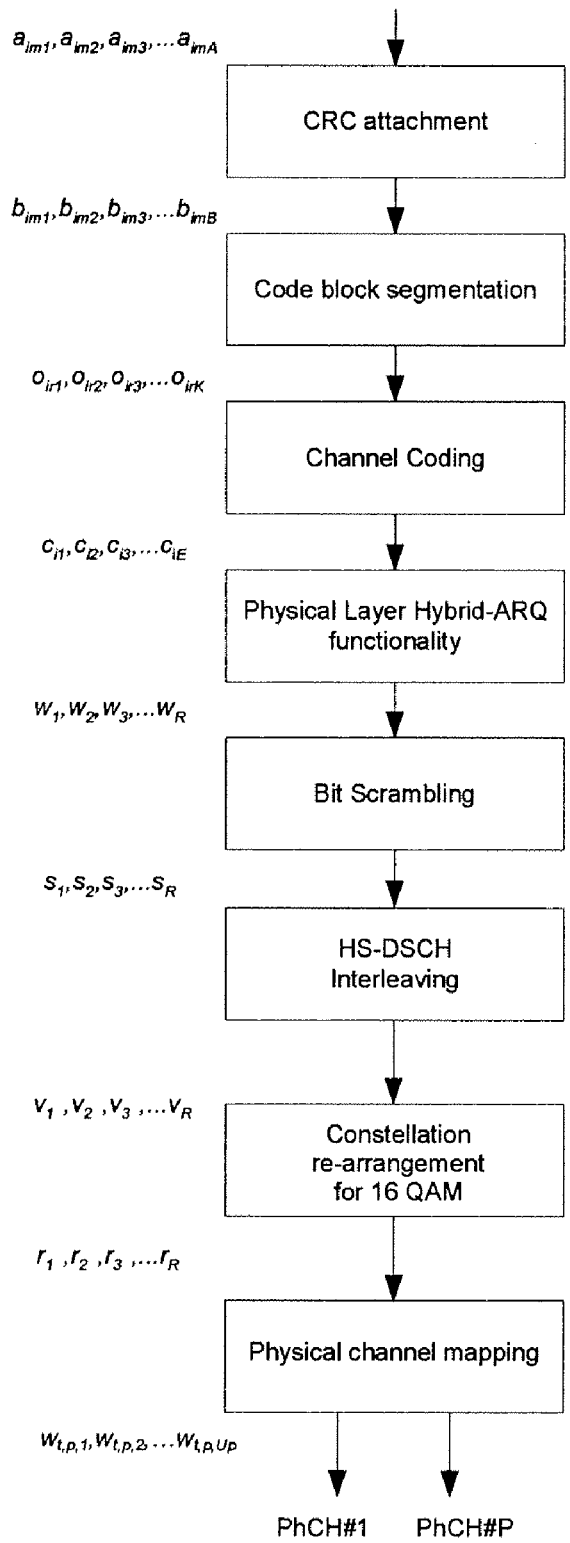
FIG. 2e illustrates a block diagram of a transport channel multiplexing structure (Transmitter BRP) for HSDPA LCR data channels (Reference 3GPP Specification TS 25.222 V5.7.0).
Figure 5A:
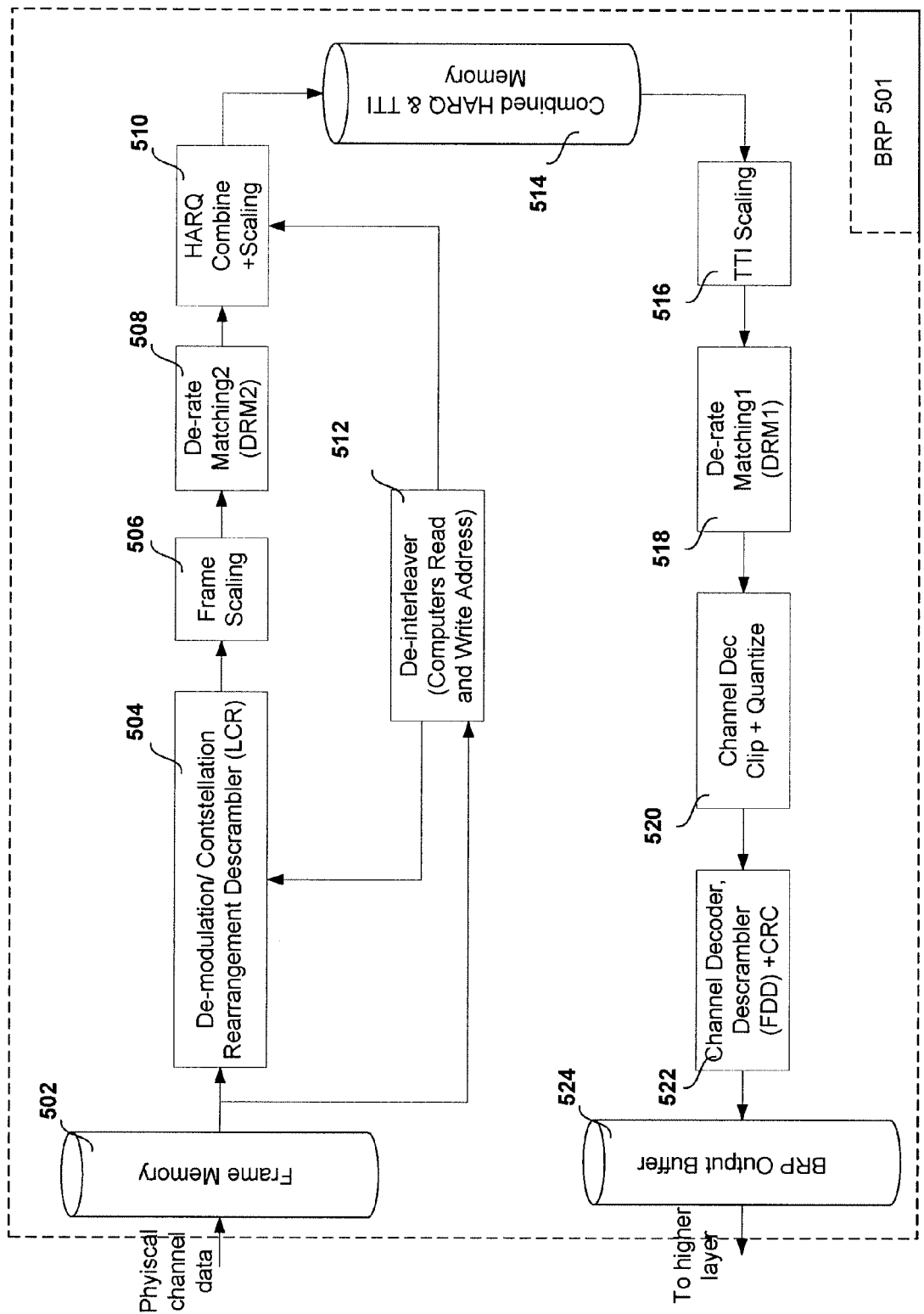
FIG. 5a illustrates a block diagram of an example high level multi-mode BRP architecture.
Figure 5B:
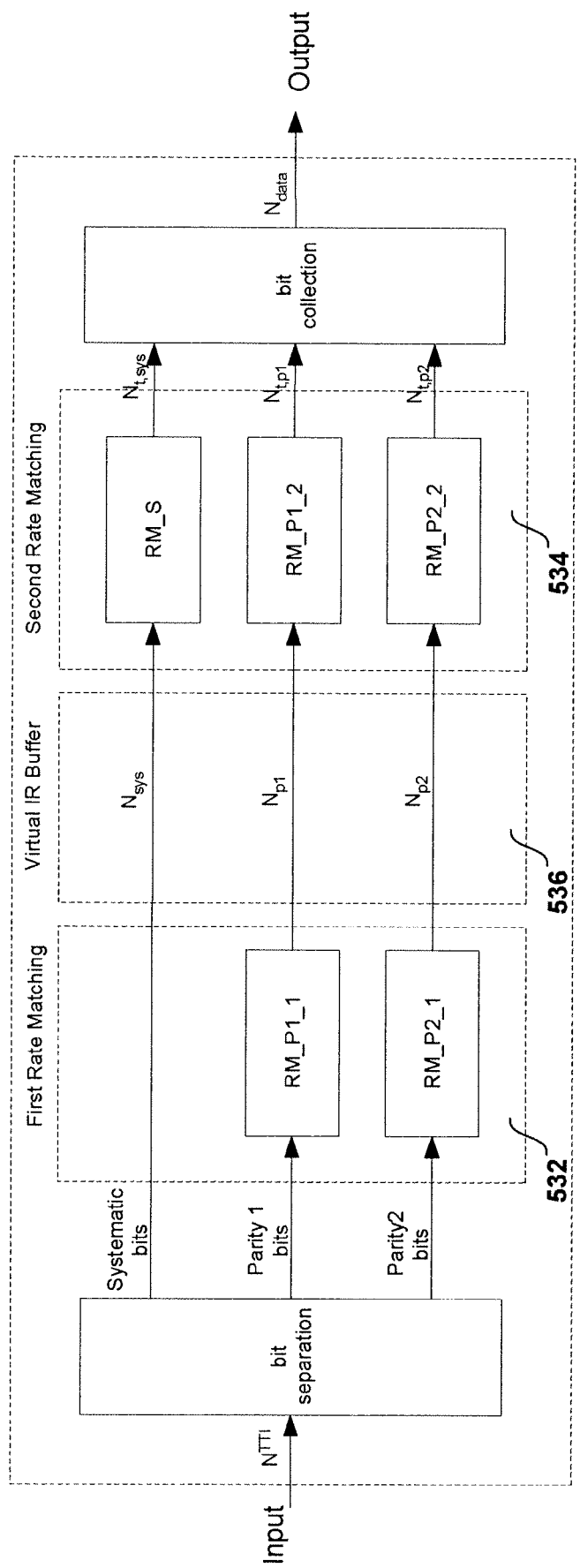
FIG. 5b illustrates a block diagram of a two-stage rate-matching of a hybrid automatic repeat-request module in a transmitter BRP.

3GPP physical layer standard specifies the transmitter part of a radio link. FIG. 2b shows a block diagram of a transmitter BRP corresponding to Release 4 FDD channels. FIG. 2c shows a block diagram of a transmitter BRP corresponding to FDD HSDPA data channels. FIG. 2d shows a block diagram of a transmitter BRP corresponding to Rel4 LCR channels. FIG. 2e shows a block diagram of a transmitter BRP corresponding to LCR HSDPA data channels. FIG. 5b shows a block diagram of physical layer hybrid automatic repeat-request (HARQ) functionality of HSDPA channels. As shown in FIG. 5b HARQ includes two stages of rate matching, i.e., operations performed by a first rate matching 532 and a second rate matching module 534, separated by virtual incremental redundancy (IR) buffer 536. The transmitter BRP corresponding to the four operation modes described above are similar in some aspects however they are distinctly different. For example, Release4 channels may have only one stage of rate matching and HSDPA channels have two stages of rate matching.

The receiver part of the radio link is not specified in the standard and each vendor can have their own implementation to satisfy desired performance requirements. FIG. 5a shows a high level generic system implementation of a multi-mode receiver BRP 501. The multi-mode BRP 501 can be configured as the receiver for all the four operating modes described above.

As shown in the example of FIG. 2, the inner receiver implementation is specific to LCR and FDD signals. That is, upon receiving a FDD signal, the inner receiver is typically a rake receiver or a chip level equalizer. In a wireless communication system, signals may propagate over many paths from a transmitter to a receiver. When multiple downlink data streams are multiplexed and transmitted via orthogonal codes, multi-path propagation may destroy orthogonality, creating severe multi-access interference (MAI). Typical mobile units in CDMA systems employ a rake receiver that includes a channel matched filter. A chip-level equalizer 104 can also be employed to restore (demodulate) the orthogonality, thereby reducing MAI in the bit estimates.

Unlike the matched filter-based receiver that regards the interferences as noises, a device designed to remove an influence of the interferences between the users by processing user and interference signals jointly is referred to as a "joint detector (JD)" or "multi-user detector". In the LCR signal chain 212, the LCR inner receiver can use a joint detection accelerator (JDA) 214.

Post rake processing module 210 and post JD processing module 218 in respective FDD signal chain 206 and LCR signal chain 212 are configured to provide the constellation gain for 16QAM demodulation and soft decision values. Additionally, modules 210 and 218 may also perform BRP processing specific to different signal standards.

Figure 3:
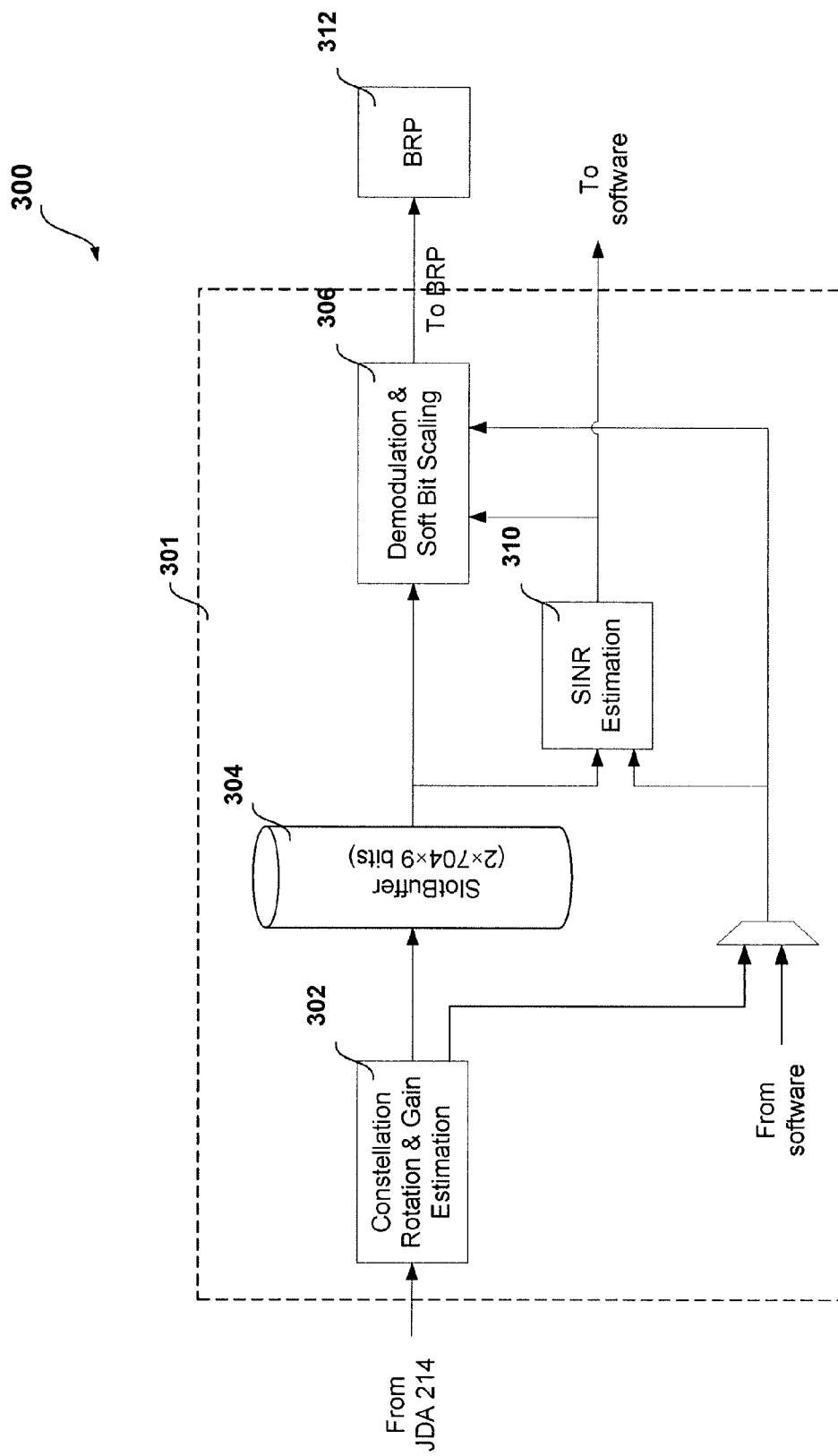
FIG. 3 illustrates an example implementation of LCR joint detection post processing that interfaces between a joint detection accelerator (JDA) and a bit rate processor (BRP) module.

There are various ways to implement the post JD processing module 218. FIG. 3 shows an example implementation 301 in a LCR signal chain 212, and FIG. 4 below shows an example in which implementation 401 is configured to facilitate a multi-mode BRP 414.

FIG. 3 shows a block diagram of LCR post JD processing implementation 301 which establishes an interface between the joint detection accelerator 214 and a single mode BRP 312. In a communication system, the reception of the data transmitted is impaired by the conditions of the communication channel. As a consequence, the received signal needs to go through a series of reconstruction phases before it can be presented to the user. In a TD-SCDMA system, the signal processing modules of the receiver chain may perform functionalities including joint detection, demodulation and channel de-mapping/decoding. After joint detection, the signal has undergone a first level of reconstruction, but still needs post-processing before it can be decoded.

The post JD processing module 301 estimates two important signal parameters: the Constellation Gain and the Signal to Interference-plus-Noise Ratio (SINR). The constellation gain is initially estimated based upon the output of the joint detection accelerator 214 without knowing the transmitted sequence. The SINR can be subsequently estimated with constellation gain estimation. For best performance, a correction function may be used to remove estimation bias from the SINR estimate.

Referring to FIG. 3, input data stream containing all channel codes from the joint detection accelerator 214 is fed to a constellation rotation and gain estimation module 302. Constellation rotation rotates the constellation by 45 degrees to resemble the FDD constellation. This operation allows direct use of algorithms derived for WCDMA. The subsequent operations and modules, e.g., a constellation gain estimation module 302, a SINR estimation module 310 and a demodulation and soft bit scaling module 306, all assume FDD constellation format in subsequent data processing. In one implementation, the post JD hardware module 218 performs blind constellation gain estimation. The constellation gain is supplied to the SINR estimation module 310. Alternatively, the constellation gain and SINR estimation can be implemented in the software based on joint detection output and the computed constellation gain and SINR can be fed back to hardware (i.e., bypassing the constellation gain estimation and SINR estimation in hardware). A control bit may be used to select between constellation gain. SINR value is computed by the hardware or provided by the software.

A slot buffer/memory 304 is used to buffer the data from the constellation gain estimation module 302. The downstream post JD computation is performed by demodulation and soft bit scaling module 306, which is responsible for the demodulation and conversion to log-likelihood ratio (LLR) soft bits. It may require constellation gain and noise power estimation, depending on the desired performance level. Bit scaling refers to the multiplying of the soft bits by the slot SINR and ensures that bursts of low quality are weighed less than bursts of high quality in the subsequent channel decoding.

In FIG. 3, physical channel de-mapping is performed by the BRP module 312, which is after the demodulation performed by module 306. Physical channel de-mapping is specific to LCR or FDD standards and demodulation is required for both LCR and FDD. In some implementations, the signal processing order of demodulation and de-mapping can be exchanged so as to keep all standard specific functionality in the Post JD module. BRP module 312 does processing of functionality common to both LCR and FDD standards.

Figure 4:
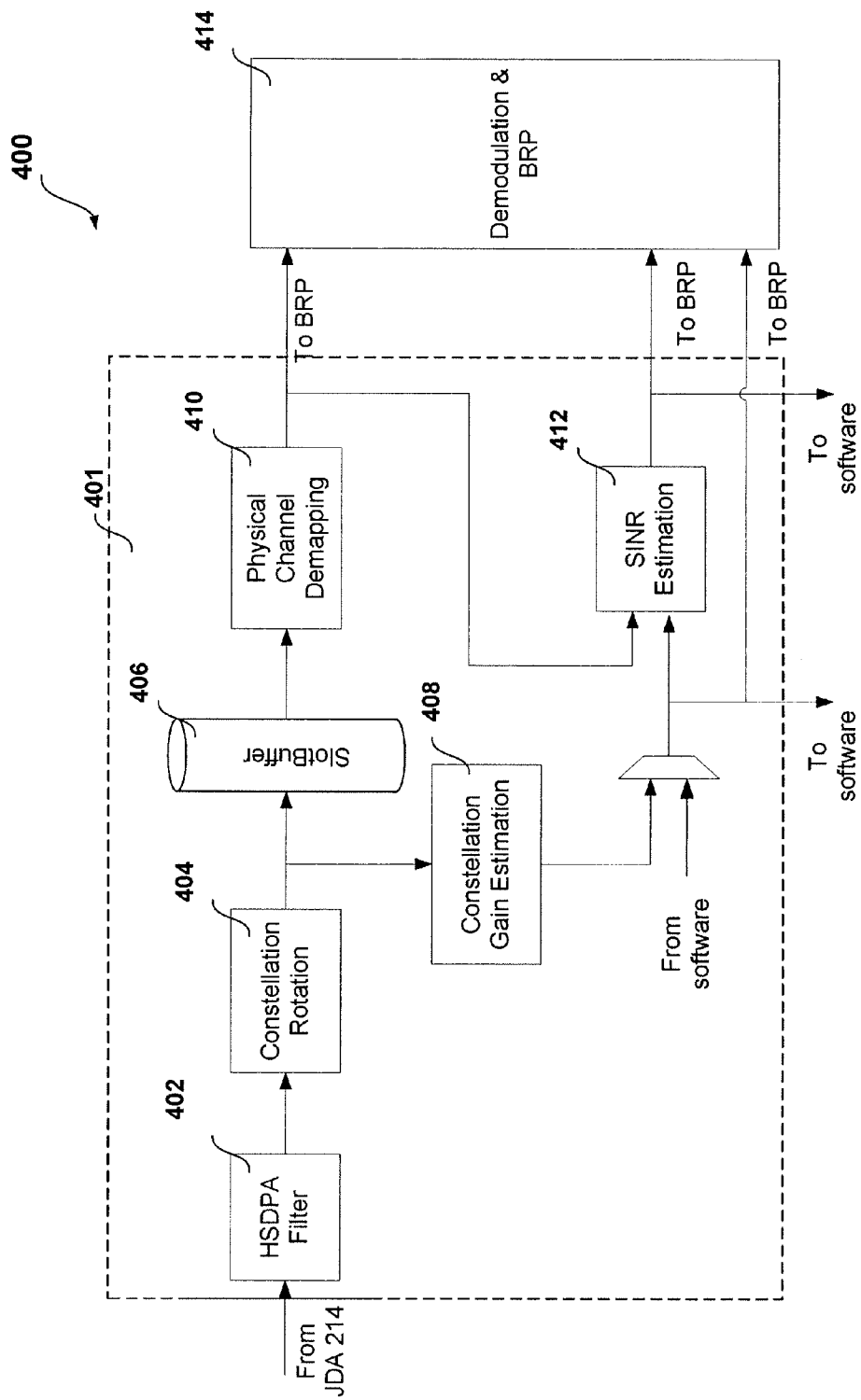
FIG. 4 illustrates an example implementation of post joint detection processing for a multi-mode BRP.

FIG. 4 shows an example implementation 400 of post JD processing in which demodulation is performed in BRP 414 and de-mapping is performed in a Post JD processing module 401. In order to make hardware more efficient, some of the algorithms have been merged to reuse data read from memory and thereby reducing (e.g., minimizing) the total number of memory accesses. For SINR estimation, the JDA 214 output can be evaluated anywhere in the signal chain. In the illustrated implementation, the SINR estimation module 412 has been chosen to evaluate the output after physical channel demapping module 410, because this configuration reduces (minimizes) the number of memory accesses to the Slot-Buffer 406.

A HSDPA filter 402 is used to extract HS-DSCH from JDA 214 output buffer. The Post JD module 218 can be implemented according to implementation 400, which may be responsible for processing codes associated with a high speed downlink shared channel (HS-DSCH) defined in UMTS, and the output of the JDA 214 contains codes assigned to a particular user equipment (UE). A UE refers to any device used directly by an end user to communicate. It can be a hand-held telephone 102 in FIG. 1, a data card in a laptop computer, or any other device that connects to a communication base station (e.g., 3G Base Transceiver Station). Such an implementation 400 may also be used to include a high-speed shared control channel (HS-SCCH), or other dedicated channels (e.g., a voice call) etc.

FIG. 5a shows a high level generic system implementation of a multi-mode BRP 501. The multi-mode BRP 501 is similar to the BRP 210 in FIG. 2. Because BRP implementation involves frequent access to memory, reducing memory requirement by combining BRP 501 functional blocks and placing memory at strategic locations becomes the main design target. In this regard, for example, a TTI memory 514 can be designed to be placed before a de-rate matching1 module (DRM1) 518 in a FDD Release 4 channel signal chain 206 and after de-rate matching2 (DRM2) module 508 in a LCR Release 4 channel signal chain 212.

In one implementation, the result of the post joint detection operations may be a set of physical channel data, in the form of soft decisions, for a selected user equipment (UE). Such data is stored in a frame memory 502 that also holds a complete frame of soft decisions stored with a bit width value plus an exponent for each time slot. In some implementations, the maximum exponent within the frame may be identified and used to calculate a single frame exponent. This frame exponent is used to re-scale the soft decisions as they are transferred from the frame memory 502 to the combined HARQ & TTI memory 514. Re-scaling operation maintains the same number of bits of precision across all slots of a frame by shifting down the significant bits of the soft decisions from slots with a smaller exponent value. All soft decisions within the frame thus have the same exponent value, the same as the maximum exponent. The exponent associated with the scaling of the frame is then stored in an exponent store (not shown in Figure).

The demodulation, constellation rearrangement and the bit descrambling operations have been merged in module 504. In particular, constellation rearrangement is used for HSDPA (in bypass mode for Release 4 channels), and bit descrambling in the BRP 504 is used for LCR signal.

In some implementations, data may undergo multiple levels of scaling in the multi-mode BRP 501. In particular, frame scaling module 506 may enable soft decisions in one frame to have the same exponent. The input data to BRP includes multiple slots and each slot can have its own slot exponent. The value of slot exponent depends on the SINR of the data received during the slot. Frame scaling consists of scaling the soft value of the frame so that all soft values in the frame have the same frame exponent. A hybrid automatic repeat-request (HARQ) combining & scaling module 510 processes soft decisions in HARQ memory to achieve the same exponent when operating on data associated with a given HSDPA channel. Hybrid ARQ is a special ARQ mode where the receiver stores the received soft decisions if it was received incorrectly. When the transmitter does a retransmission, receiver jointly decodes the newly received soft decisions and the previously stored soft decisions of the same data packet. HARQ combining and scaling module 510 first scales the soft decisions of the two transmissions such that they have the same exponent, and then does the maximum likelihood combining of soft decisions received during the two transmissions. The hybrid automatic repeat-request (HARQ) combining and HARQ scaling module 510 is used for HSDPA channels.

TTI scaling module 516 processes soft decisions in the TTI memory 514 belonging to a transport channel to have the same exponent when operating on data associated with Rel4 channels. A TTI may include multiple frames and each frame can have its own frame exponent. TTI scaling may include scaling the soft decisions in a TTI such that all soft decisions belonging to a transport channel TTI have the same exponent.

Channel decoder scaling is mostly performed in a clipping and quantizing module 520 in which data quantization is completed before channel decoding such that soft decisions are scaled to, for example, 4 bits. This operation may reduce the bit widths and hence the gate count needed for a channel decoder module 522.

A de-rate matching2 module 508 can be configured as either for hybrid automatic repeat-request (HARQ) de-rate matching or for TD-SCDMA Release 4 channel LCR de-rate matching. The de-rate matching2 module 508 is in bypass mode for WCDMA Release 4 channels.

Rate matching at the transmitter involves puncturing or repetition of bits so that the bit rate after rate matching can match channel capacity. Inverse operation of rate matching is performed in the downlink receiver, so that the bit rate after de-rate matching matches the input rate to the channel decoder or to the incremental redundancy (IR) memory size allocated for the channel. Inverse rate matching includes the following operations: (1) zero insertion in place of punctured bits; and (2) maximum likelihood combining of repeated bits. The functionality of a de-rate matching engine is similar for HSDPA and for Release 4 channels.

Data processing in a downlink receiver 204 may preserve the order of performing a second de-rate matching stage (e.g., DRM2 module 508 and associated operations) prior to a first de-rate matching stage (e.g., DRM1 module 518 and associated operations) as a result of specific signal processing order in a corresponding transmitter BRP.

Referring to FIG. 5b, in some examples, according to the technical specification of 3GPP TS 25.222 V5.7.0 (2004-09), a two-stage rate matching HARQ in a transmitter BRP 530 may include a first rate matching module 532 followed by a second rate matching module 534.

As shown in FIG. 5b, the first rate matching module 532 may match the number of input bits to a virtual IR buffer 536. The number of soft channel bits available in the virtual IR buffer 536 may be obtained from higher layers for each HARQ process. The second rate-matching module 534 and associated operations apply an algorithm for puncturing or repeating bits at the output of the first rate-matching stage. The rate matching algorithm may also be applied differently to different set of input bits (systematic and parity bits). However, bit collection and bit separation functionality may be significantly different for various data transmission channels.

Referring back to FIG. 5a, a TTI scaling module 516 is used for Release 4 channels. The DRM1 module 518 can be configured as either for HSDPA de-rate matching1 or for FDD Release 4 channel de-rate matching. The DRM1 module 518 is in bypass mode for TD-SCDMA Release 4 channels.

A de-interleaver module 512 computes read address of the frame memory 502 and read/write address of the combined HARQ memory & TTI memory 514. In some implementations, for example, when operating with Release 4 channels, the de-interleaver module 512 may perform the following functions when writing into the TTI memory 514: a) physical channel de-segmentation, b) detection and removal of 2nd discontinuous transmission (DTX) indication bits, c) detection and removal of 1st discontinuous transmission (DTX) indication bits except in the case of explicit blind transport format detection, d) transport channel de-multiplexing, and e) radio frame de-segmentation.

As a secondary function of PhCH de-interleaving, the de-interleaver module 512 also produces a sequence of slot numbers from which soft decisions came as they are read from the frame memory. These slot numbers are used to look up corresponding exponents for the frame re-scale function.

A combined HARQ & TTI Memory module 514 can be configured as either HARQ memory or TTI memory based upon the specific signal schemes. Memory organization of module 514 is controlled by software. For example, the address of the transport channel or HARQ process may be programmed by software. Furthermore, the location where data associated with the HSDPA transport channel (TrCH) or Release 4 TrCH are saved in the memory is programmed by software. Memory space can be dynamically allocated to either Release 4 channels or HSDPA channels.

As for channel decoding module 522, the multi-mode downlink BRP 501 supports turbo decoding, convolutional decoding or no coding mode. In the case of no coding, the sign bit of the soft decision is passed through from the de-rate match module 518 to the channel decoding module 522 which also performs cyclic redundancy check (CRC) checking.

Convolutional decoding is implemented with the Viterbi algorithm. In some implementations, a Viterbi decoder is optimized for 4-bit inputs and 9-bit metrics. Eight parallel butterflies are used to calculate the metrics. The implementation also takes advantage of enhancements to allow controlled overflow and reduced bit widths.

An output buffer 524 includes two banks of memory to store two frames of decoded data plus CRC status. An internal bank select logic ping-pongs between the two buffers for read and write. The output buffer 524 can be read either by a DSP directly or through the coprocessor direct memory access (DMA).

Figure 6:
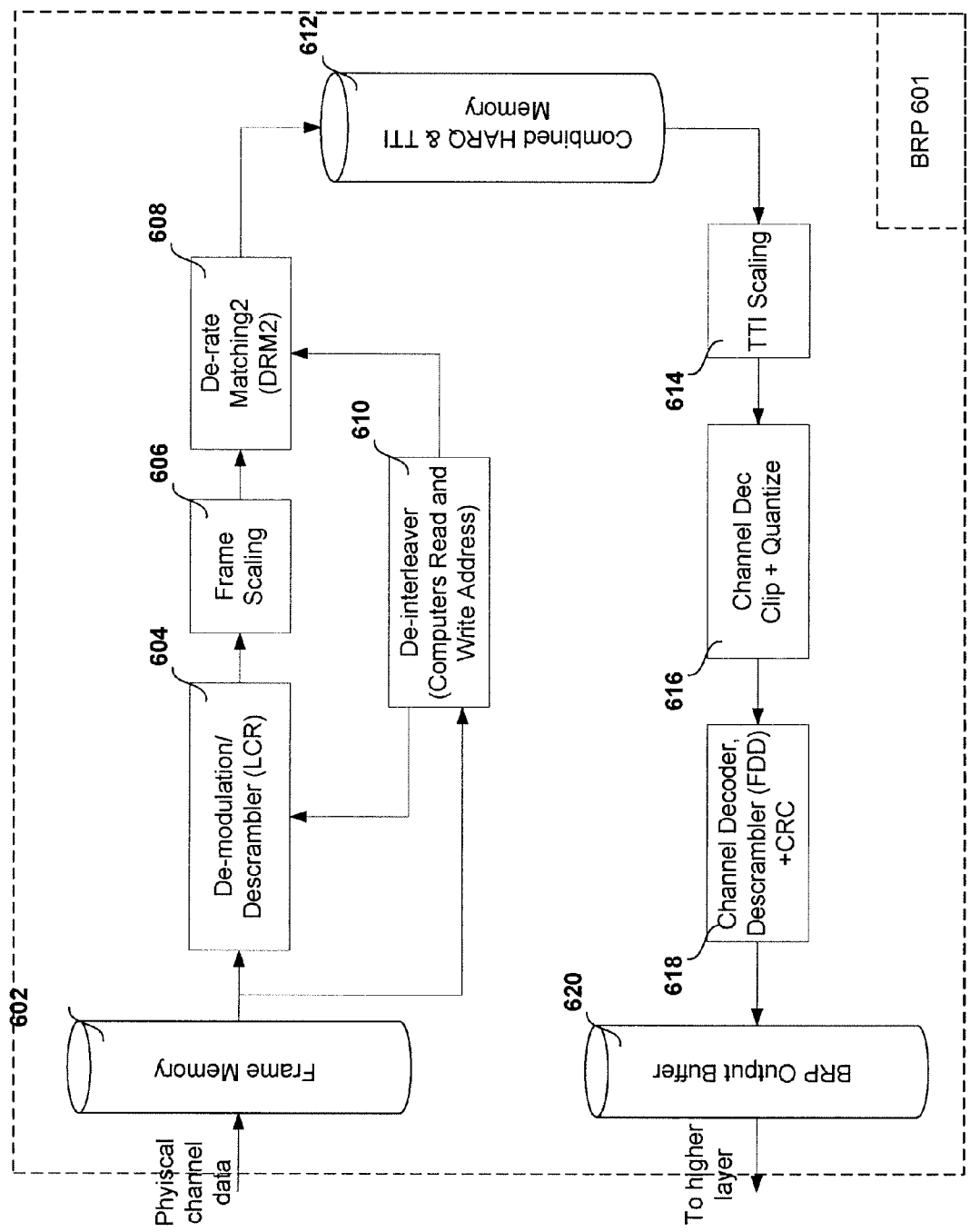
FIG. 6 illustrates a block diagram of an example BRP architecture operating in Release 4 channel LCR BRP mode.

FIG. 6 illustrates a block diagram of a BRP 601 specifically configured for a Release 4 channel LCR BRP operation mode. The functional signal processing modules in this implementation are similar to corresponding modules presented in FIG. 5. In order to tailor the system implementation in accordance with specific signal scheme and data rate, the multi-mode BRP 601 may selectively enable module functionalities, and bypass unneeded processing modules. For example, the HARQ combine module 510 and de-rate matching1 module 518 in FIG. 5 are in bypass mode in the illustrated implementation in FIG. 6, and the DRM2 module 608 performs all de-rate matching operations for this specific Release 4 channel LCR BRP signal scheme. Accordingly, a module 604 is configured to perform de-modulation and descrambling for LCR signals.

Figure 7:
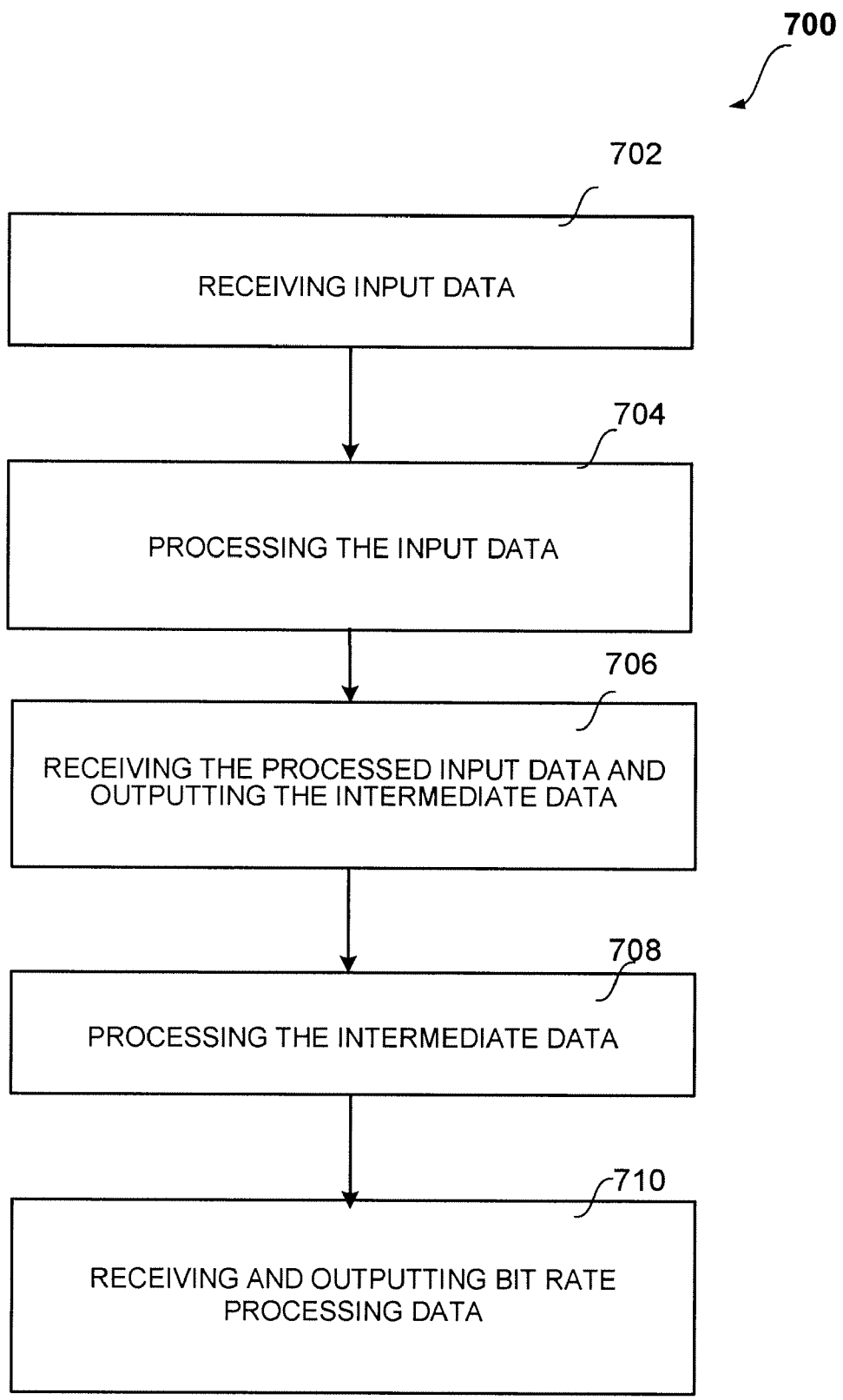
FIG. 7 illustrates a flow diagram showing example processing operations of a multi-mode BRP.

FIG. 7 is a flow diagram showing an example process 700 for implementing multi-mode bit rate processing in connection with specific data transmission rate and standard in a wireless communication system.

In process 700, input data are received (702). For example, input data from physical channels can be received in a memory module, such as frame memory 502 in FIG. 5. In some implementations, physical channel data may be downloaded into the frame memory 502 using burst DMA transfers, either on a time slot basis or sub-frame basis, depending on a DSP memory and DMA interrupt overhead trade-offs. After the frame memory 502 has been filled, frame rate configuration information is programmed using another DMA transfer. The input data are processed (704). For example, the subsequent signal processing modules of FIG. 5 can be selected to process the input data based upon data and transmission channel specifications. Operations on the input data may include physical channel de-mapping (e.g., module 504), second de-interleaving (e.g., module 512), de-scrambling, transport channel de-multiplexing, and de-rate matching (e.g., module 508).

The process 700 includes receiving the processed input data and outputting the intermediate data. For example, the BRP 210 (in FIG. 2) can receive processed input data and subsequently allocate the data in the combine HARQ & TTI memory module 514 of FIG. 5 in connection with data and transmission channel specifications.

The process 700 includes outputting the intermediate data (706), and processing the intermediate data (708). For example, the intermediate data can be output from module 514 to be further processed in a second plurality of sub-modules, such as the TTI scaling module 516, the DRM1 module 518, and etc. in FIG. 5. Each of the second plurality of sub-modules is selected to function based upon data and transmission channel specifications. For example, in the implementation as shown in FIG. 6, because the multi-mode BRP 210 is specifically configured to process data associate with a LCR Release 4 channel, the HARQ combine module 510 and de-rate matching1 module 518 in FIG. 5 are in bypass mode, and the DRM2 module 608 may perform all de-rate matching operations. The module 604 is accordingly configured to perform de-modulation and descrambling for LCR signals.

The process 700 includes receiving and outputting bit rate processing data (710). For example, the BRP 210 may include an output buffer, such as the module 620 of FIG. 6, to receive and output bit rate processing data for higher transmission layers.

In this description, connections may be wired or wireless connections. When one module is said to be connected to another module, the module may be directly connected or indirectly connected (via, e.g., still another module) to the other module.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the application and provides examples to describe the invention and to enable a person of ordinary skill in the art to make and use the invention. This written description does not limit the application to the precise terms set forth. Thus, while the application has been described in detail with reference to the examples set forth above, those of ordinary skill in the art can effect alterations, modifications and variations to the examples without departing from the scope of the application.

What is claimed is:

1. An apparatus for processing signals in a wireless system, comprising:
    a first memory module to receive input data from a set of physical channels;
    a first plurality of sub-modules that are adaptively selected to process the input data, at least some of the first plurality of sub-modules being selected based upon data and transmission channel specifications;
    a second memory module to receive processed input data and output intermediate data, in which locations where the input data are stored in the second memory are allocated in connection with the data and transmission channel specifications;
    a second plurality of sub-modules that are adaptively selected to process the intermediate data, at least some of the second plurality of sub-modules being selected based upon the data and transmission channel specifications; and
    a third memory module to receive the data processed by the second plurality of sub-modules;
    wherein the first plurality of sub-modules comprise a first de-rate matching module, the second plurality of sub-modules comprise a second de-rate matching module, the first de-rate matching module is selected for a first data and transmission channel specification but not selected for a second data and transmission channel specification, and the second de-rate matching module is selected for the second data and transmission channel specification but not selected for the first data and transmission channel specification.

2. The apparatus of claim 1, wherein the data and transmission channel specifications are defined in accordance with at least one of:
    Low Chip Rate (LCR) Time Division Synchronous Code Division Multiple Access (TD-SCDMA) Release 4 channels;
    LCR High Speed Downlink Packet Access (HSDPA) channels;
    Frequency Division Duplex (FDD) Wideband Code Division Multiple Access (WCDMA) Release 4 channels; and
    FDD WCDMA HSDPA channels.

3. The apparatus of claim 1, wherein the first plurality of sub-modules comprise at least one of:
    a combined module of a de-modulation module, a constellation re-arrangement module and a de-scrambler module,
    a frame scaling module,
    a de-interleaver module, and
    a hybrid automatic repeat request (HARQ) combine and scaling module.

4. The apparatus of claim 1, wherein the second plurality of sub-modules comprise at least one of:
    a transmission time interval (TTI) scaling module,
    a channel decoding clipping and quantization module, and
    a combined module of a channel decoder module, a descrambler module, and a cyclic redundancy check (CRC) module.

5. The apparatus of claim 3, wherein the de-interleaver module comprises at least one of a second de-interleaver module and a transport channel (TrCH) de-interleaver module.

6. The apparatus of claim 3, wherein the de-interleaver module is configured to compute read addresses of the first memory module, and compute read and write addresses of the second memory module.

7. The apparatus of claim 1, wherein the first de-rate matching module is configured to operate on data associated with High Speed Downlink Packet Access (HSDPA) channels.

8. The apparatus of claim 1, wherein the first de-rate matching module is configured to operate on data associated with Low Chip Rate (LCR) Release 4 channels.

9. The apparatus of claim 3, wherein the HARQ combine and scaling module operates on data associated with High Speed Downlink Packet Access (HSDPA) channels.

10. The apparatus of claim 1, wherein the first de-rate matching module is bypassed when performing rate matching of data associated with Frequency Division Duplex (FDD) Release 4 channels.

11. The apparatus of claim 4, wherein the TTI scaling module operates on data associated with Release 4 channels.

12. The apparatus of claim 1, wherein the second de-rate matching module is configured to operate on data associated with High Speed Downlink Packet Access (HSDPA) channels, and Frequency Division Duplex (FDD) Release 4 channels.

13. The apparatus of claim 1, wherein the second de-rate matching module is bypassed when performing de-rate matching of data associated with Time Division Synchronous Code Division Multiple Access (TD-SCDMA) Release 4 channels.

14. The apparatus of claim 1, wherein the second memory module comprises at least one of a hybrid automatic repeat request (HARQ) memory and a transmission time interval (TTI) memory that is configured based on data and transmission channel specifications.

15. The apparatus of claim 1, wherein the second memory module is controlled and configured by software.

16. The apparatus of claim 1, wherein the second memory module is programmed by software to determine locations in the second memory module for storing data of transport channels associated with High Speed Downlink Packet Access (HSDPA) channels.

17. The apparatus of claim 1, wherein the second memory module is programmed by software to determine locations in the second memory module for storing data of transport channels associated with Release 4 channels.

18. The apparatus of claim 1 in which the second de-rate matching module is selected for High Speed Downlink Packet Access (HSDPA) channels or Frequency Division Duplex (FDD) Release 4 channels but not selected for Time Division Synchronous Code Division Multiple Access (TD-SCDMA) Release 4 channels.

19. The apparatus of claim 1 in which the first plurality of sub-modules comprises a hybrid automatic repeat-request (HARQ) combining & scaling module that is selected for High Speed Downlink Packet Access (HSDPA) channels but not selected for Release 4 channels.

20. The apparatus of claim 1 in which the first de-rate matching module is selected for Low Chip Rate (LCR) Release 4 channels but not selected for Frequency Division Duplex (FDD) Release 4channels.

21. The apparatus of claim 1 in which the first de-rate matching module is selected for High Speed Downlink Packet Access (HSDPA) channels but not selected for Frequency Division Duplex (FDD) Release 4 channels.

22. A method for processing signals in a wireless system, comprising:
    storing, in a first memory module, input data from a set of physical channels;
    processing the input data in selected ones of a first plurality of sub-modules, the selected ones of the first plurality of sub-modules being selected based upon data and transmission channel specifications;
    storing, in a second memory module, processed input data, in which locations where the input data are stored in the second memory module are allocated based on the data and transmission channel specifications;
    reading intermediate data from the second memory module;
    processing the intermediate data in selected ones of a second plurality of sub-modules, the selected ones of the second plurality of sub-modules being selected based upon data and transmission channel specifications; and
    receiving and outputting bit rate processing data in a third memory module;
    wherein the first plurality of sub-modules comprise a first de-rate matching module, the second plurality of sub-modules comprise a second de-rate matching module, the first de-rate matching module is selected for a first data and transmission channel specification but not selected for a second data and transmission channel specification, and the second de-rate matching module is selected for the second data and transmission channel specification but not selected for the first data and transmission channel specification.

23. The method of claim 22, wherein the data and transmission channel specifications are defined in accordance with at least one of:
    Low Chip Rate (LCR) Time Division Synchronous Code Division Multiple Access (TD-SCDMA) Release 4 channels;
    LCR High Speed Downlink Packet Access (HSDPA) channels;
    Frequency Division Duplex (FDD) Wideband Code Division Multiple Access (WCDMA) Release 4 channels; and
    FDD WCDMA HSDPA channels.

24. The method of claim 22, wherein the first plurality of sub-modules comprise at least one of:
    a combined module of a de-modulation module, a constellation re-arrangement module and a de-scrambler module,
    a frame scaling module,
    a first de-interleaver module, and
    a hybrid automatic repeat request (HARQ) combine and scaling module.

25. The method of claim 22, wherein the second plurality of sub-modules comprise at least one of:
    a transmission time interval (TTI) scaling module,
    a channel decoding clipping and quantization module, and
    a combined module of a channel decoder module, a descrambler module, and a cyclic redundancy check (CRC) module.

26. The method of claim 24, wherein the de-interleaver module is configured to compute read addresses of the first memory module and compute read and write addresses of the second memory module.

27. The method of claim 24, wherein the first de-rate matching module operates on data associated with High Speed Downlink Packet Access (HSDPA) channels and the Low Chip Rate (LCR) Release 4 channels, and output data to the HARQ combine and scaling module.

28. The method of claim 24, wherein the HARQ combine and scaling module operates data associated with High Speed Downlink Packet Access (HSDPA) channels.

29. The method of claim 25, wherein the TTI scaling module operates on data associated with Release 4 channels.

30. The method of claim 25, wherein the second de-rate matching module operates on data associated with High Speed Downlink Packet Access (HSDPA) channels and Frequency Division Duplex (FDD) Release 4 channels.

31. The method of claim 22, wherein the second memory module comprises at least one of a hybrid automatic repeat request (HARQ) memory and a transmission time interval (TTI) memory that is configured based upon data and transmission channel specifications.

32. The method of claim 22, wherein the second memory module is controlled and configured by software.

33. The method of claim 22, wherein the second memory module is programmed by software to determine locations of transport channels associated with High Speed Downlink Packet Access (HSDPA) channels and Release 4 channels in the second memory module.

34. The method of claim 24, wherein the de-interleaver module comprises at least one of a second de-interleaver module and a transport channel (TrCH) de-interleaver module.

35. A method for processing signals in a wireless system, comprising:
    processing user data and interference signals from a set of physical channels in connection with joint detection algorithms;
    performing physical channel demapping of the user data; and
    processing the user data in a bit rate processor by selectively using a first set of a plurality of data processing modules and a second set of a plurality of data processing modules of the bit rate processor based upon data and transmission channel specifications;
    wherein the first set of plurality of data processing modules comprises a first de-rate matching module, the second set of plurality of data processing modules comprises a second de-rate matching module, the first de-rate matching module is positioned upstream of a memory buffer, the second de-rate matching module is positioned downstream of the memory buffer, the first de-rate matching module is selected for a first data and transmission channel specification but not selected for a second data and transmission channel specification, and the second de-rate matching module is selected for the second data and transmission channel specification but not selected for the first data and transmission channel specification.

36. The method of claim 35, wherein the data and transmission channel specifications are defined in accordance with at least one of:

Low Chip Rate (LCR) Time Division Synchronous Code Division Multiple Access (TD-SCDMA) Release 4 channels;

LCR High Speed Downlink Packet Access (HSDPA) channels;

Frequency Division Duplex (FDD) Wideband Code Division Multiple Access (WCDMA) Release 4 channels; and FDD WCDMA HSDPA channels.

37. An apparatus for processing signals in a wireless system, comprising:

a first memory module to store input data from a set of physical channels;

means for selecting a subset of a first plurality of sub-modules based upon data and transmission channel specifications to process the input data;

a second memory module to store processed input data, in which locations where the input data are stored in the second memory module are allocated based on the data and transmission channel specifications;

means for selecting a subset of a second plurality of sub-modules based upon data and transmission channel specifications to process intermediate data read from the second memory module; and a third memory module to receive the data processed by the selected subset of the second plurality of sub-modules;

wherein the first plurality of sub-modules comprise a first de-rate matching module, the second plurality of sub-modules comprise a second de-rate matching module, the first de-rate matching module is selected for a first data and transmission channel specification but not selected for a second data and transmission channel specification, and the second de-rate matching module is selected for the second data and transmission channel specification but not selected for the first data and transmission channel specification.

\* \* \* \* \*

UNITED STATES PATENT AND TRADEMARK OFFICE
CERTIFICATE OF CORRECTION

| | | |
|---|---|---|
| PATENT NO. | : 8,149,702 B2 | Page 1 of 1 |
| APPLICATION NO. | : 12/199640 | |
| DATED | : April 3, 2012 | |
| INVENTOR(S) | : Deepak Mathew et al. | |

It is certified that error appears in the above-identified patent and that said Letters Patent is hereby corrected as shown below:

Col. 15, line 20, delete "4channels." and insert -- 4 channels. --

Signed and Sealed this
Twenty-ninth Day of May, 2012

David J. Kappos
*Director of the United States Patent and Trademark Office*